US008497932B2

(12) United States Patent
Morimoto (10) Patent No.: US 8,497,932 B2
(45) Date of Patent: Jul. 30, 2013

(54) PHOTOGRAPHING APPARATUS AND METHOD HAVING AT LEAST TWO PHOTOGRAPHING DEVICES AND EXPOSURE SYNCHRONIZATION (75) Inventor: Yasuhiro Morimoto, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 12/624,568

(22) Filed: Nov. 24, 2009

(65) Prior Publication Data
US 2010/0134651 A1 Jun. 3, 2010

(30) Foreign Application Priority Data

Nov. 28, 2008 (JP) ................................. 2008-305454

(51) Int. Cl.
G03B 7/00 (2006.01)
H04N 5/235 (2006.01)

(52) U.S. Cl.
USPC .......................................... 348/362; 382/274

(58) Field of Classification Search
USPC .................. 348/42–50, 207.99, 220.1, 229.1, 348/239, 262, 336, 362; 352/44, 166; 382/154, 382/254, 274, 294
See application file for complete search history.

(56) References Cited

U.S. PATENT DOCUMENTS

| 6,157,409 | A * | 12/2000 | Riches | 348/362 |
| 2002/0024635 | A1 * | 2/2002 | Oshima | 352/166 |
| 2003/0063259 | A1 * | 4/2003 | Huber | 352/44 |
| 2003/0071905 | A1 | 4/2003 | Yamasaki | |
| 2003/0231250 | A1 * | 12/2003 | Okano et al. | 348/239 |
| 2005/0093982 | A1 * | 5/2005 | Kuroki | 348/207.99 |
| 2005/0094869 | A1 * | 5/2005 | Yoda et al. | 382/154 |
| 2006/0007344 | A1 * | 1/2006 | Neufeld | 348/336 |
| 2006/0008171 | A1 * | 1/2006 | Petschnigg et al. | 382/254 |
| 2006/0221209 | A1 * | 10/2006 | McGuire et al. | 348/239 |
| 2007/0030342 | A1 * | 2/2007 | Wilburn et al. | 348/47 |
| 2007/0076100 | A1 * | 4/2007 | Muraki | 348/220.1 |
| 2008/0211941 | A1 * | 9/2008 | Deever et al. | 348/262 |

FOREIGN PATENT DOCUMENTS

| JP | 2001-285688 A | 10/2001 |
| JP | 2001-292370 A | 10/2001 |
| JP | 2002-190978 A | 7/2002 |
| JP | 2003-189171 A | 7/2003 |
| JP | 2005-086219 A | 3/2005 |
| JP | 2007-288605 A | 11/2007 |
| JP | 2010-107900 A | 5/2010 |

OTHER PUBLICATIONS

Office Action established for JP 2008-305454 (Jul. 31, 2012).

* cited by examiner

Primary Examiner — Nelson D. Hernández Hernández
Assistant Examiner — Dennis Hogue
(74) Attorney, Agent, or Firm — Drinker Biddle & Reath LLP (57) ABSTRACT A photographing apparatus includes a first photographing device converting incident light from an object through a first optical system to an electric signal, a second photographing device converting incident light from the object through a second optical system to an electric signal, an image signal processing unit generating a first image signal corresponding to the electric signal converted by the first photographing device and a second image signal corresponding to the electric signal converted by the second photographing device, and an exposure control unit controlling a first exposure start time of the first photographing device and a second exposure start time of the second photographing device so that the first exposure start time and the second exposure start time are different from each other.

7 Claims, 8 Drawing Sheets

PHOTOGRAPHING APPARATUS AND METHOD HAVING AT LEAST TWO PHOTOGRAPHING DEVICES AND EXPOSURE SYNCHRONIZATION

CROSS-REFERENCE TO RELATED PATENT APPLICATION

This application claims the benefit of Japanese Patent Application No. 2008-305454, filed on Nov. 28, 2008, in the Japanese Intellectual Property Office, the disclosures of which are incorporated herein in their entirety by reference.

BACKGROUND

The present invention relates to a photographing apparatus and method.

In a photographing apparatus, such as a digital still camera, capable of photographing a still image, not only one still image but also a plurality of still images may be continuously photographed (continuous shooting). In a photographing apparatus having an optical system and a photographing system (photographing device) corresponding to the optical system, the following methods have been used to implement the continuous shooting: (1) performing photographing using only an electronic shutter, and not using a mechanical shutter, (2) performing an extraction reading and not reading a full frame from the whole photographing device, and (3) reading only one side field.

However, according to the method (1), when the photographing device is a CMOS device and a moving object is to be photographed, image quality is deteriorated due to the rolling shutter. Also, according to the methods (2) and (3), since the number of pixels decreases compared to the original characteristic of a photographing device, the resolution is deteriorated.

Also, Japanese Patent Publication No. 2002-190978 ("JP '978") discloses that, in a photographing apparatus having an optical system and a plurality of photographing devices, transmitted light beyond the photographing lens is divided into a plurality of light rays by a prism and the divided light rays are received by other photographing devices. However, in JP '978, since a complicated optical system is needed, extensive time is required for manufacturing a photographing apparatus and also sensitivity is deteriorated due to the effect of the prism.

SUMMARY

The present invention provides a photographing apparatus and method by which continuous still images are obtained without a substantive reduction of sensitivity and deterioration of image quality.

According to an aspect of the present invention, a photographing apparatus includes a first photographing device converting incident light from an object through a first optical system to an electric signal, a second photographing device converting incident light from the object through a second optical system to an electric signal, an image signal processing unit generating a first image signal corresponding to the electric signal converted by the first photographing device and a second image signal corresponding to the electric signal converted by the second photographing device, and an exposure control unit controlling a first exposure start time of the first photographing device and a second exposure start time of the second photographing device so that the first exposure start time and the second exposure start time are different from each other.

The exposure control unit may control that any one of the first exposure start time and the second exposure start time is located between continuous exposure start times of the other one of the first exposure start time and the second exposure start time.

The exposure control unit may control that any one of the first exposure start time and the second exposure start time is located in the middle of continuous exposure start times of the other one of the first exposure start time and the second exposure start time.

The exposure control unit may control that any one of the first exposure start time and the second exposure start time is located during an exposure time from exposure start time of the other one of the first exposure start time and the second exposure start time.

The photographing apparatus may further include an illumination unit for providing a flash during exposure of one of the first and second photographing devices and not providing a flash during exposure of the other one of the first and second photographing devices, and a synthesis unit for synthesizing parts or the whole of the first image signal and the second image signal, wherein one of the first and second image signals is an image signal obtained by providing a flash and the other one thereof is an image signal obtained without providing the flash.

The photographing apparatus may further include a position deviation detection unit detecting information about position deviation between the first and second image signals, wherein the synthesis unit synthesizes parts or the whole of the first and second image signals based on the detected position deviation information.

The photographing apparatus may further include a position deviation detection unit detecting information about position deviation between the first and second image signals, and an image processing unit performing image processing to the first and second image signals using the detected position deviation information, and generating a three dimensional image using at least one plane image having no position deviation information that is continuous according to a time between a first image corresponding to the first image signal and a second image corresponding to the second image signal or a plurality of pieces of position deviation information that are continuous according to a time between the first image and the second image.

According to another aspect of the present invention, a photographing apparatus includes a first photographing device converting incident light from an object through a first optical system to an electric signal, a second photographing device converting incident light from the object through a second optical system to an electric signal, an image signal processing unit generating a first image signal corresponding to the electric signal converted by the first photographing device and a second image signal corresponding to the electric signal converted by the second photographing device, and an exposure control unit controlling a first exposure start time of the first photographing device and a second exposure start time of the second photographing device and controlling the exposure start time of any one of the first photographing device and the second photographing device has the same timing as that of the other one of the first photographing device and the second photographing device.

The photographing apparatus may further include a position deviation detection unit detecting information about position deviation between the first and second image signals and a synthesis unit synthesizing parts or the whole of the first and second image signals based on the detected position deviation information.

In the above-described photographing apparatus, the exposure control unit control each of the continuous first exposure start times and each of the continuous second exposure start times to have the same timing.

The photographing apparatus may further include an image processing unit that performs image processing on the first and second image signals using the detected position deviation information, and generating a three-dimensional image using at least one plane image having no position deviation information that is continuous according to a time between a first image corresponding to the first image signal and a second image corresponding to the second image signal or a plurality of pieces of position deviation information that are continuous according to a time between the first image and the second image.

According to one or more embodiments of the present invention, a photographing method includes converting light received from an object through a first optical system to an electric signal using a first photographing device, converting light received from the object through a second optical system to an electric signal using a second photographing device, generating a first image signal based on the electric signal converted by the first photographing device and a second signal based on the electric signal converted by the second photographing device, and controlling a first exposure start time of the first photographing device and a second exposure start time of the second photographing device to be different from each other.

The controlling of a first exposure start time of the first photographing device and a second exposure start time of the second photographing device to be different from each other may include controlling any one of the first and second exposure times to be located between continuous exposure start times of the other one of the first exposure start time and the second exposure start time, when the first and second photographing devices are continuously exposed and read.

According to another aspect of the present invention, a photographing method includes converting light received from an object through a first optical system to an electric signal using a first photographing device, converting light received from the object through a second optical system to an electric signal using a second photographing device, generating a first image signal based on the electric signal converted by the first photographing device and a second signal based on the electric signal converted by the second photographing device, controlling a first exposure start time of the first photographing device and a second exposure start time of the second photographing device, and controlling the exposure start time of any one of the first photographing device and the second photographing device has the same timing as that of the other one of the first photographing device and the second photographing device.

In the above-described photographing method, the controlling of the first and second exposure start times to have the same timing may be controlling of each of the continuous first exposure start times and each of the continuous second exposure start times to have the same timing.

The above-described photographing method may further include detecting position deviation information between the first and second image signals and synthesizing parts or the whole of the first and second image signals based on the detected position deviation information.

The above-described photographing method may further include detecting position deviation information between the first and second image signals, and generating a three dimensional image using at least one plane image having no position deviation information that is continuous according to a time between a first image corresponding to the first image signal and a second image corresponding to the second image signal or a plurality of pieces of position deviation information that are continuous according to a time between the first image and the second image.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

Figure 1:
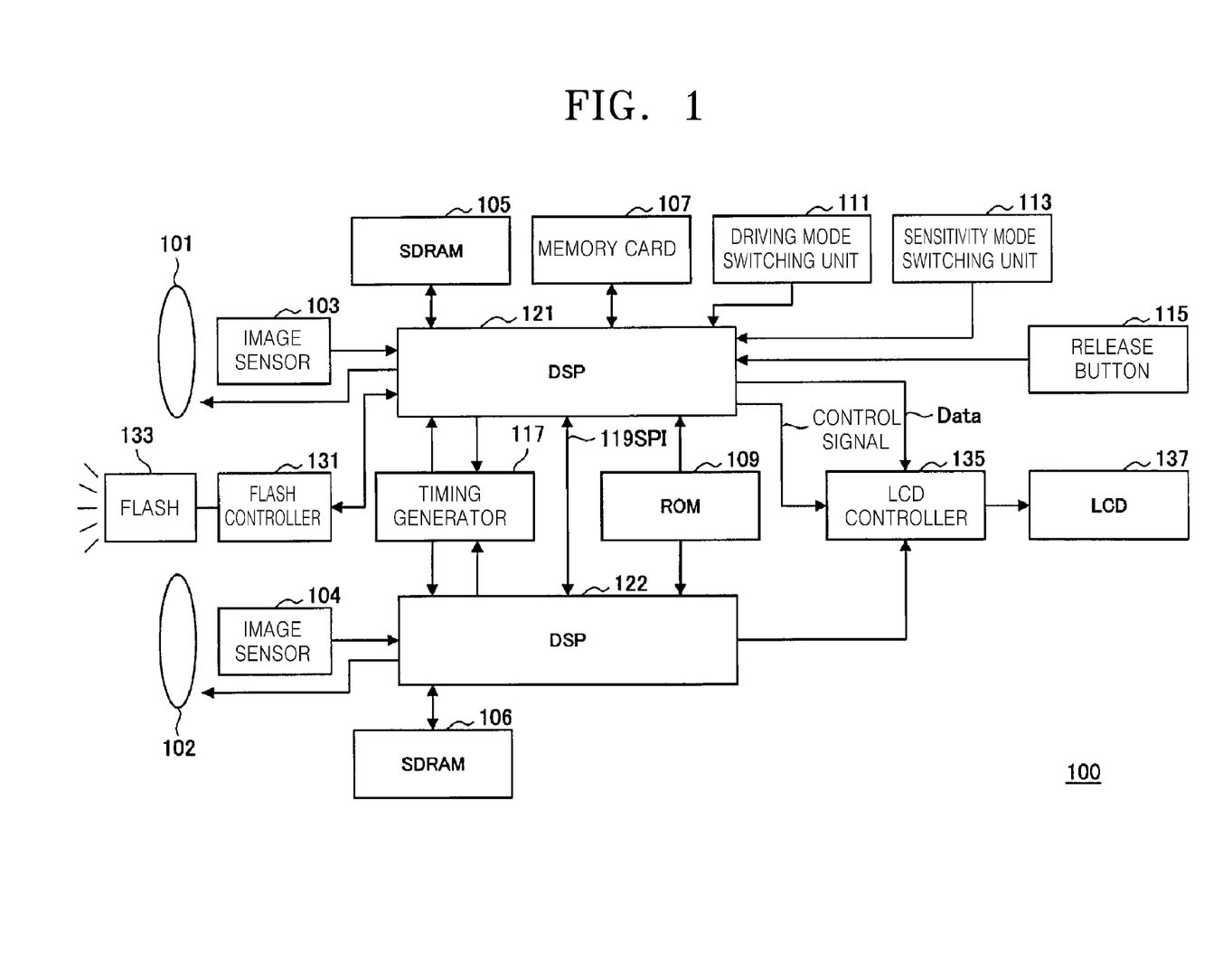
FIG. 1 is a block diagram of a photographing apparatus according to an exemplary embodiment of the present inventive concept.

FIG. 1 is a block diagram of a photographing apparatus 100 according to an exemplary embodiment of the present inventive concept. Referring to FIG. 1, the photographing apparatus 100 includes, for example, two optical systems and two photographing systems. Each of the optical systems and each of the photographing systems photograph an object to obtain an image of the object. For example, during a live-view display, while one optical and photographing system may take a live-view image, the other optical and photographing system may perform photometry. Also, since the optical systems are arranged at the left and right sides to take images of the same timing, a stereo image (a three dimensional image) may be generated.

The photographing apparatus 100 includes, for example, optical systems 101 and 102, first and second image sensors 103 and 104, synchronous RAMs (SDRAMs) 105 and 106, a memory card 107, a ROM 109, a driving mode switching unit 111, a sensitivity mode switching unit 113, a release button 115, a timing generator 117, digital signal processors (DSPs)

121 and 122, a flash controller 131, a flash 133, a liquid crystal display (LCD) controller 135, and an LCD 137 or other form of display or controller.

The optical systems 101 and 102 may include, for example, a first optical system and a second optical system. Also, the optical systems 101 and 102 are optical systems to focus an image on the first and second image sensors 103 and 104. The optical systems 101 and 102 transmit light from the object to the first and second image sensors 103 and 104. While the light passing through the first optical system 101 arrives at the first image sensor 103, the light passing through the second optical system 102 arrives at the second image sensor 104.

Each of the optical systems 101 and 102 may include a zoom lens (not shown), an aperture (not shown), and a focus lens (not shown). The zoom lens is used to change a viewing angle by changing a focal length. The aperture is used to control the amount of light that is transmitted from the object to the first and second image sensors 103 and 104. While moving from one side to the other side or vise versa, the focus lens focuses the object on a photographing surface of each of the first and second image sensors 103 and 104.

The first and second image sensors 103 and 104 are examples of first and second photographing devices (photoelectric conversion devices), and may include at least one device capable of performing photoelectric conversion to convert information on incident light by passing through the optical systems 101 and 102 to an electric signal. Each device generates an electric signal according to the received light. Each of the first and second image sensors 103 and 104 may be a charge coupled device (CCD) sensor or a complementary metal oxide semiconductor (CMOS) sensor.

Also, to control the exposure time of the first and second image sensors 103 and 104, a mechanical shutter (not shown) to block light during a non-photographing time and allow the light to pass during a photographing time may be provided. Also, the present inventive concept is not limited thereto and thus an electronic shutter (not shown) may be employed. The operation of the mechanical shutter or the electronic shutter is performed by a switch of the release button 115 (an operation member). The operation of the mechanical shutter or the electronic shutter may be performed under the control of the DSPs 121 and 122 connected to the release button 115.

Each of the first and second photographing devices may further include a correlated double sampling (CDS)/amplifier (AMP) unit (not shown) and an analog/digital (A/D) conversion unit (not shown). The CDS/AMP unit removes low frequency noise included in the electric signal output from each of the first and second image sensors 103 and 104 and amplifies the electric signal to a certain level. The A/D conversion unit converts the electric signal output from the CDS/AMP unit to a digital signal. The A/D conversion unit outputs the generated digital signal to the DSPs 121 and 122.

The SDRAMs 105 and 106 are used as a video RAM (VRAM). The VRAM is a memory for image display and has a plurality of channels. The VRAM may simultaneously perform input of image data for image display and output of image data to the LCD controller 135. The resolution or maximum number of colors of the LCD 137 is dependent on the capacity of the VRAM.

Each of the SDRAMs 105 and 106 temporarily stores image data of a photographed image. The SDRAMs 105 and 106 have memory capacities sufficient to store image data of a plurality of images. Also, the SDRAMs 105 and 106 are respectively connected to the DSPs 121 and 122. The reading/writing of an image from/to the SDRAMs 105 and 106 is controlled by a memory controller 151 of FIG. 2.

The memory card 107 is a semiconductor memory medium such as a flash memory. Image data generated from photographing is recorded on, or read from, the memory card 107. In the present inventive concept, the recording medium is not limited to the memory card 107 such as a flash memory, and optical discs such as CDs, DVDs, or Blu-ray discs, optomagnetic discs, or magnetic discs may be used as the recording medium. The memory card 107 may be configured to be detachable from the photographing apparatus 100. The ROM 109 stores operation programs of the DSPs 121 and 122.

The driving mode switching unit 111 switches between a continuous shooting mode, a high speed shooting mode, and a single shooting mode in the photographing apparatus 100. The sensitivity mode switching unit 113 switches between a normal sensitivity mode and high sensitivity mode.

The release button 115 may be half pressed, fully pressed, or released by a user. When the release button 115 is half pressed (Operation S1), an operation signal to start focus control is output. The focus control is terminated by releasing the half pressing. Also, when the release button 115 is fully pressed (Operation S2), an operation signal to start photographing is output.

Also, the photographing apparatus 100 may include an operation member (not shown) in addition to the release button 115. The operation member may be, for example, up, down, left, and right keys, a power switch, and a mode dial which are installed on the photographing apparatus 100. The operation member transmits an operation signal to the DSPs 121 and 122 based on the operation by the user.

The timing generator 117 outputs a timing signal to the first and second image sensors 103 and 104 and controls reading of charges or the exposure time of each pixel constituting the first and second image sensors 103 and 104. Also, the timing generator 117 may output a timing signal to the CDS/AMP unit.

The DSPs 121 and 122, as examples of image signal processing units, function as operation processing units and control units by a program and control processing of each constituent element installed in the photographing apparatus 100. The DSPs 121 and 122 output a signal to a driver (not shown) based on the focus control or exposure control, thereby driving the optical systems 101 and 102. Also, the DSPs 121 and 122 control the respective constituent elements of the photographing apparatus 100 based on the signal output from the operation member. In the present exemplary embodiment, as illustrated in FIG. 1, each of the DSPs 121 and 122 may be connected to each photographing system. Each of the DSPs 121 and 122 is configured to separately generate a command for a signal system and a command for an operation system.

Figure 8:
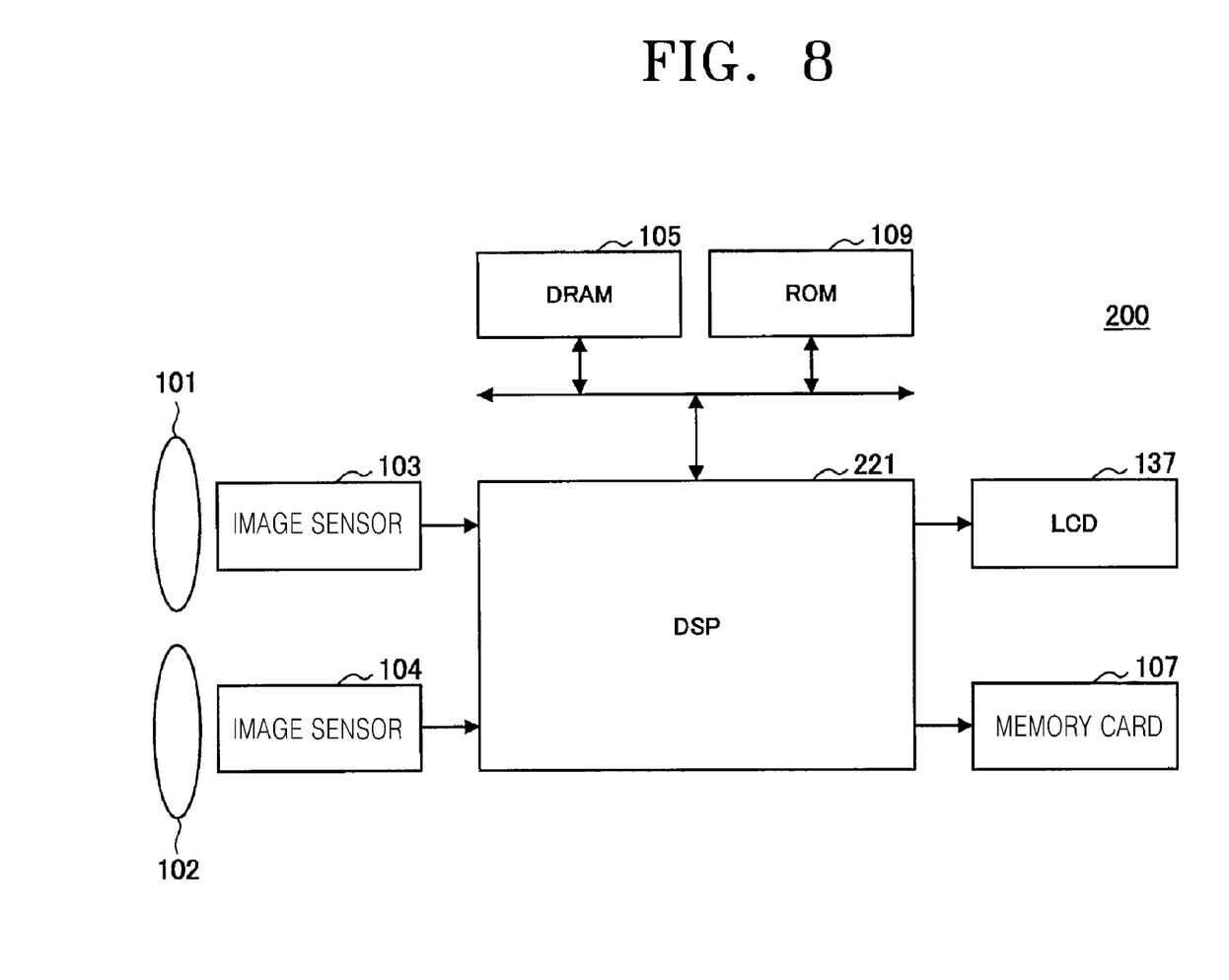
FIG. 8 is a block diagram illustrating a photographing apparatus that is a modified example of the photographing apparatus of FIG. 1.

FIG. 8 is a block diagram illustrating a photographing apparatus 200 that is a modified example of the photographing apparatus 100 of FIG. 1. Referring to FIG. 8, a DSP 221 may be formed of a single CPU because the command for a signal system and the command for an operation system are generated by a single CPU. Since detailed portions of the photographing apparatus 200 in FIG. 8 are substantially the same as those of the photographing apparatus 100, descriptions thereof will be omitted herein.

The flash controller 131 generates a control signal based on the signal received from the first DSP 121 and transmits a generated control signal to the flash 133. The flash 133 illuminates light to the object during main photographing or focus control prior to the main photographing.

Figure 2:
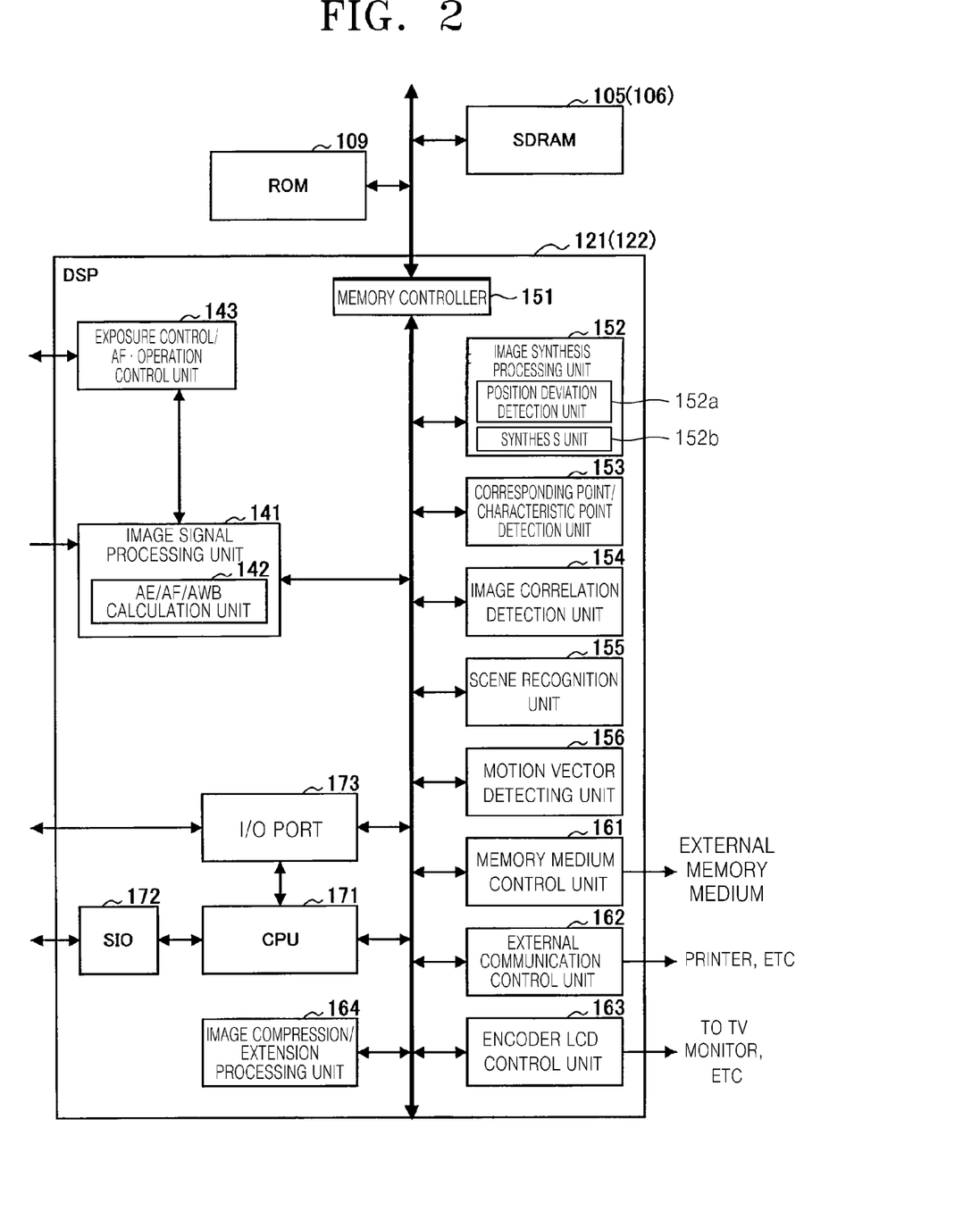
FIG. 2 is a block diagram illustrating the DSP of the photographing apparatus of FIG. 1.

The LCD controller 135 receives image data from, for example, an encoder LCD control unit 163 of FIG. 2, and displays an image on the LCD 137. The LCD 137 is installed on a main body of the photographing apparatus 100. The images displayed on the LCD 137 are, for example, an image (live-view display) prior to photographing that is read from the SDRAM 105, a variety of setting screens of the photographing apparatus 100, or an image recorded during photographing. In the present exemplary embodiment, the LCD 137 and the LCD controller 135 are respectively used as a display unit and a display driving unit. However, the present inventive concept is not limited thereto, and thus, for example, an organic EL display and an organic EL display control unit or any other type of display and respective control may be employed therefor.

FIG. 2 is a block diagram illustrating the DSPs 121 and 122 of the photographing apparatus 100 of FIG. 1. Referring to FIG. 2, each of the DSPs 121 and 122 includes an image signal processing unit 141, an auto exposure (AE)/auto focus (AF)/auto white balance (AWB) calculation unit 142, the memory controller 151, an image synthesis processing unit 152, a corresponding point/characteristic point detection unit 153, an image correlation detection unit 154, a scene recognition unit 155, a motion vector detecting unit 156, a memory medium control unit 161, an external communication control unit 162, the encoder LCD control unit 163, an image compression/extension (or expansion) processing unit 164, a CPU 171, a system input/output (S10) unit 172, and an I/O port 173.

The image signal processing unit 141 receives an image signal from each of the first and second image sensors 103 and 104 and generates an image signal by performing signal processing with respect to a digital signal output from the A/D conversion unit of each of the first and second image sensors 103 and 104. The image signal processing unit 141 generates an image signal that is image processed based on a WB control value, a y value, and an outline emphasis control value. The image signal processing unit 141 calculates an AE evaluation value, an AWB evaluation value, and an AF evaluation value based on an image signal.

The AE/AF/AWB calculation unit 142 calculates an operation of the aperture or a shutter speed based on the AE evaluation value calculated by the image signal processing unit 141. The AE/AF/AWB calculation unit 142 calculates, for example, a gain of a color signal of the three prime colors, based on the AWB evaluation value calculated by the image signal processing unit 141. Also, the AE evaluation value and the AWB evaluation value are calculated by the image signal processing unit 141 based on a luminance value of an image signal.

An exposure control/AF operation control unit 143 outputs the aperture calculated by the AE/AF/AWB calculation unit 142 to a driver (not shown) of the optical systems 101 and 102 as a control signal. The driver generates a driving signal based on the control signal received from the exposure control/AF operation control unit 143. The exposure control/AF operation control unit 143 additionally controls exposure using the exposure time, the gain, and the read mode of the first and second image sensors 103 and 104. The gain is used to calculate a contrast value. The read mode of the first and second image sensors 103 and 104 is, for example, a signal processing mode when the image data is read by the first and second image sensors 103 and 104. When an object image is dark, predetermined data is added to pixel data. When the object image is bright, the whole pixels are read as they are. The exposure control/AF operation control unit 143 is an example of an exposure amount setting unit.

The exposure control/AF operation control unit 143, in response to an operation signal to start focus control, generates a control signal to move the focus lens in a direction and outputs a generated control signal to the driver 143. The exposure control/AF operation control unit 143 calculates an in-focus position of the focus lens based on the AF evaluation value calculated by the image signal processing unit 141. Also, the AF evaluation value is calculated by the image signal processing unit 141 based on the illumination value of an image signal. The AF evaluation value is, for example, a contrast value of an image. When the contrast value is at a peak, an object image is determined to be in-focus on each of image photographing surfaces of the first and second image sensors 103 and 104 (a contrast detection method).

The memory controller 151 controls the read/write of image data with respect to the SDRAMs 105 and 106. The SDRAMs 105 and 106 may be DRAMs.

The image synthesis processing unit 152 may include a position deviation detection unit 152a and a synthesis unit 152b. A first image signal and a second image signal may be obtained by exposing the first and second image sensors 103 and 104 at the same or different timing. The synthesis unit 152b of the image synthesis processing unit 152 may synthesize a first image corresponding to the first image signal and a second image corresponding to the second image signal. The position deviation detection unit 152a detects information about position deviation between the first and second images. The synthesis unit 152b may synthesize the first and second images based on the detected position deviation information.

The corresponding point/characteristic point detection unit 153 extracts a characteristic point from each of frame images and finds a corresponding point between the frame images so that the subjects of the respective frame images may be matched to each other or the corresponding point may be traced. In detail, a corresponding point may be traced by extracting a characteristic point from each of the first and second images and finding the corresponding point therebetween.

The image correlation detection unit 154 calculates correlation between the frame images. The image correlation detection unit 154 may assign correspondence between images when the number of the characteristic points detected by the corresponding point/characteristic point detection unit 153 is small or no characteristic point is found. The image correlation detection unit 154 may calculate correlation between the first and second images.

The scene recognition unit 155 determines whether a photographed scene is landscape, portrait, or sports from a detection result of the corresponding point/characteristic point detection unit 153 or the image correlation detection unit 154. The motion vector detecting unit 156 detects a motion vector of pixels among frame images.

The memory medium control unit 161 controls writing image data to the memory card 107 of FIG. 1 or reading the image data or setting information from the memory card 107. The external communication control unit 162 communicates a signal with an external apparatus such as a personal computer (PC) or a printer. The encoder LCD control unit 163 encodes image data for image display and generates data that may be displayed on the LCD 137.

The image compression/extension processing unit 164 receives an image signal prior to compression and compresses the image signal in a compression format such as JPEG compression format or MPEG compression format. The image compression/extension processing unit 164 transmits the compressed image data, for example, to the memory medium control unit 161. The CPU 171 is an operation processing unit and a control unit of the DSPs 121 and 122. The CPU 171 transceives a signal to and from an external apparatus via the SIO 172 or the I/O port 173.

Also, a series of processes in the photographing apparatus 100 may be implemented by hardware or by software, that is, a program or algorithms on a computer. Although the two optical and photographing systems are provided in the above exemplary embodiment, three or more optical and photographing systems may be provided.

The photographing apparatus 100 according to the present exemplary embodiment may include a plurality of optical and photographing systems and obtains image data from each of the optical and photographing systems at the same or different timing. The photographing apparatus 100 may change exposure timing of each of the photographing devices.

Also, the photographing apparatus 100 includes a normal continuous shooting mode and a high speed continuous shooting mode having a frame rate higher than that of the normal continuous shooting mode. In the normal continuous shooting mode, photographing is performed by using one of a plurality of photographing devices. In the high speed continuous shooting mode, photographing is performed by deviating a phase of two photographing devices such that exposure timing of a photographing device may be located between the exposures of another photographing device. In detail, exposure timing is controlled such that an exposure start time of a photographing device may be located between the continuous exposure start times of another photographing device. Thus, a continuous shooting speed may be improved without deteriorating an image quality.

Also, in the normal continuous shooting mode or in a single shooting mode for photographing photos one-by-one, a high sensitivity mode in which signal noise (SN) deterioration is low is provided. In the high sensitivity mode, a plurality of photographs are taken at the same timing. A plurality of generated images passes a high precision position alignment in a post processing and thus an image synthesis process is performed. By outputting a frame of a synthesized image, a high sensitivity image having low SN deterioration may be obtained. Thus, as the images photographed at the same phase are synthesized, high sensitivity photographing may be performed without deterioration in the image quality.

Furthermore, in the high speed continuous shooting mode, a flash is provided at the exposure timing of one of the photographing devices so that an image photographed with flash and an image photographed without flash may be alternately photographed. Also, the photographing apparatus 100 according to the present exemplary embodiment may include a 3D photographing sequence for photographing a stereo image (a three-dimensional image), in addition to a 2D photographing sequence for photographing a normal planar image (a two-dimensional image).

FIRST OPERATION EXAMPLE

Figure 3:
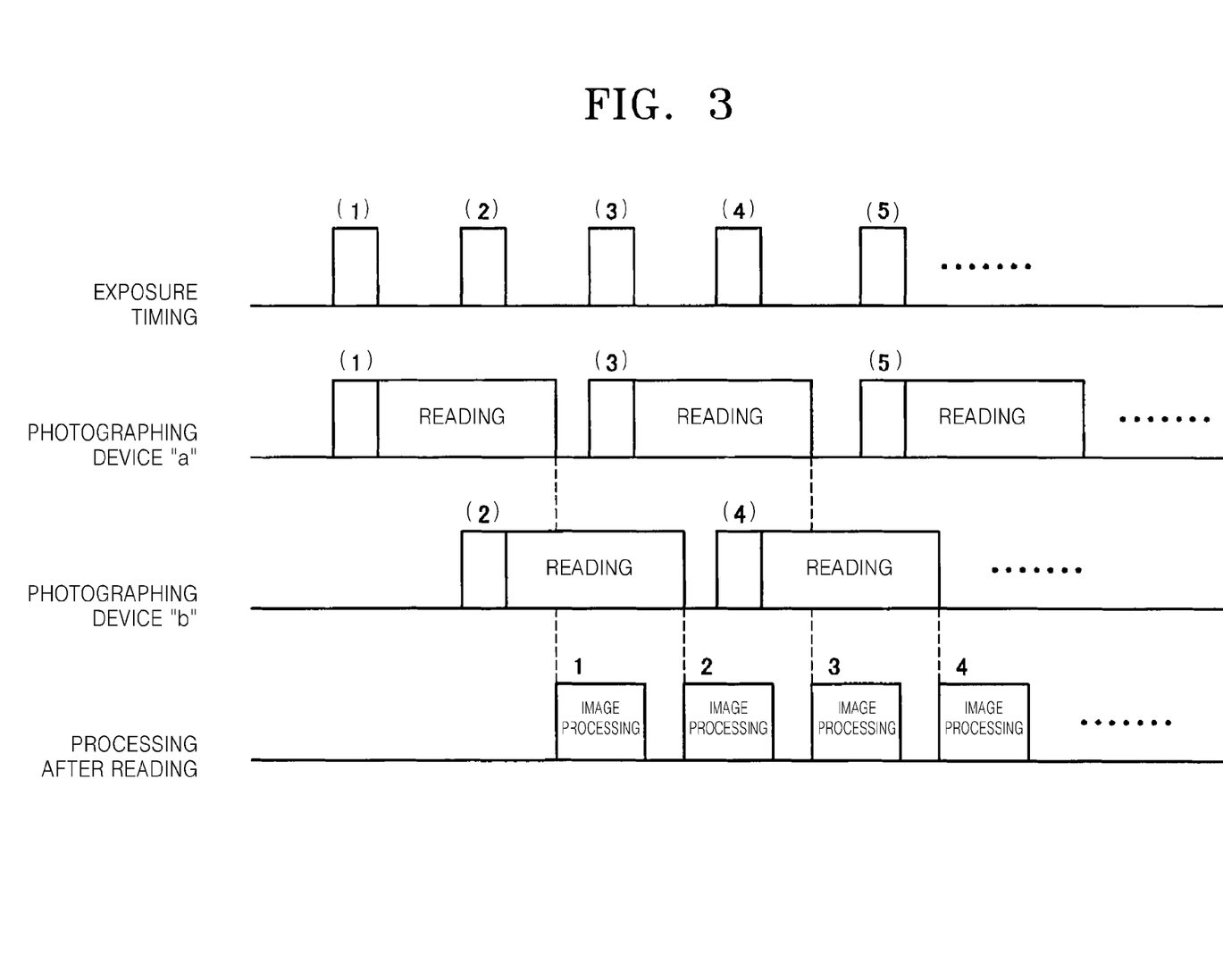
FIG. 3 is a timing diagram illustrating the first operation example of the photographing apparatus of FIG. 1.

FIG. 3 is a timing diagram illustrating the first operation example of the photographing apparatus 100 of FIG. 1. The first operation example is a high speed continuous shooting mode having a frame rate higher than that of a normal shooting mode. In the high speed continuous shooting mode, photographing is performed at a deviated phase such that exposure timing of a photographing device, for example, a photographing device "a", may be located between the consecutive exposures of another photographing device, for example, a photographing device "b". In the process after reading, image data obtained by the photographing device "a" and image data obtained by the photographing device "b" are alternately processed so that continuous image data may be generated.

Accordingly, even when photographing is performed by using the single photographing apparatus 100, continuous shooting at a double frame rate is possible compared to the continuous shooting using a single photographing device. Also, a continuous shooting speed may be improved without deteriorating an image quality.

When only one optical and photographing system is driven, as illustrated in the photographing device "a" of FIG. 3, continuous shooting may be performed at the interval of (1) and (3), or (3) and (5). This is because the continuous shooting is dependent upon the exposure time of the photographing device "a" or the processing (reading) capability of the photographing device "a". In the present exemplary embodiment, since two optical and photographing systems are in use, continuous shooting may be performed at the interval of (1) and (2), (2) and (3), (3) and (4), or (4) and (5).

SECOND OPERATION EXAMPLE

Figure 4:
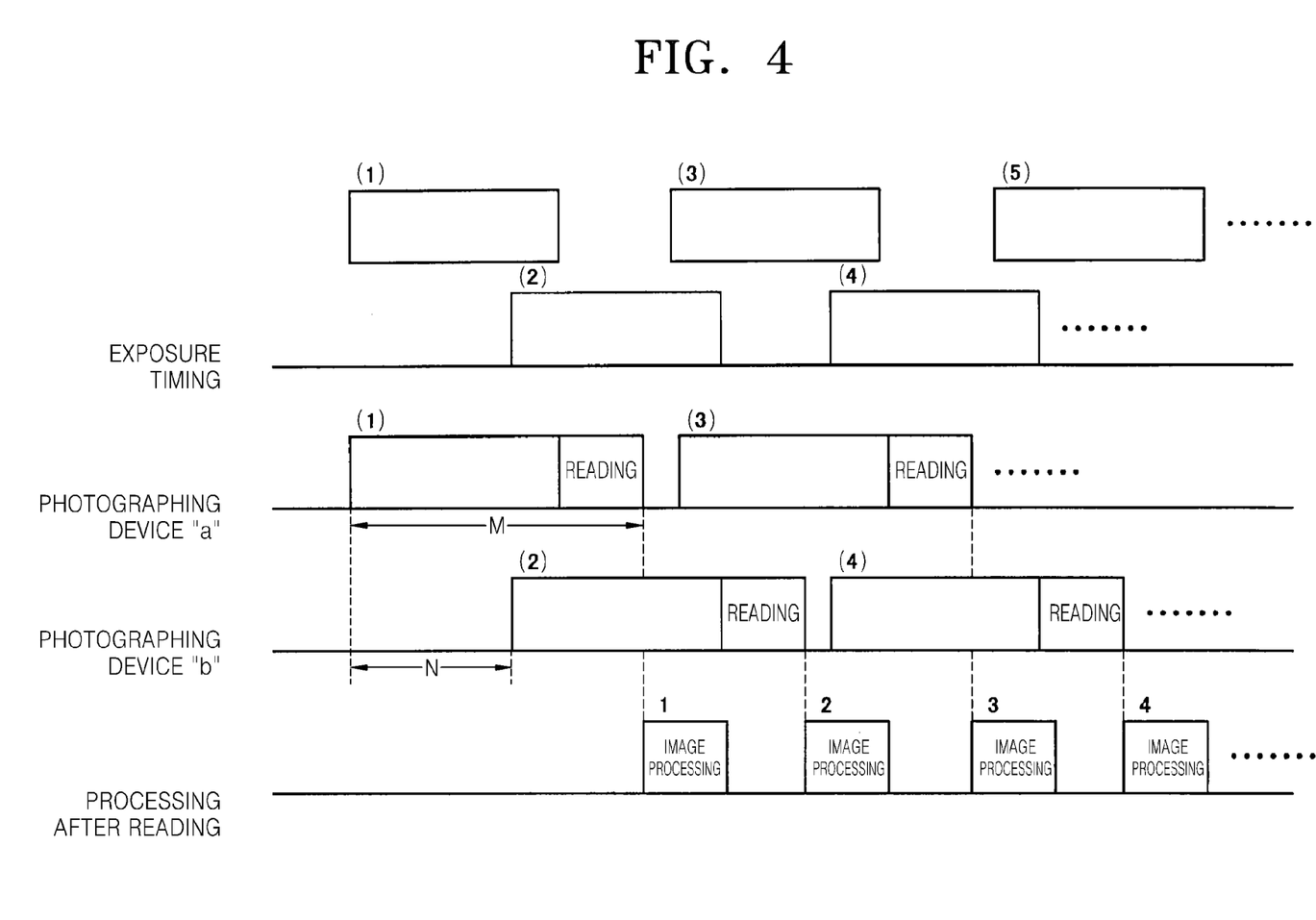
FIG. 4 is a timing diagram illustrating the second operation example of the photographing apparatus of FIG. 1.

FIG. 4 is a timing diagram illustrating the second operation example of the photographing apparatus 100 of FIG. 1. Referring to FIG. 4, the second operation example is a high speed continuous shooting mode having a frame rate higher than that of a normal shooting mode. In the second operation example, the exposure time is relatively longer than that of the first operation example. In the second operation example, as in the first operation example, photographing is performed at a deviated phase such that an exposure start time of a photographing device, for example, a photographing device "a", may be located between two consecutive exposure start times of another photographing device, for example, a photographing device "b". In the process after reading, image data obtained by the photographing device "a" and image data obtained by the photographing device "b" are alternately processed so that continuous image data may be generated.

Accordingly, even when photographing is performed by using the single photographing apparatus 100, continuous shooting at a double frame rate is possible compared to the continuous shooting using a single photographing device. Also, a continuous shooting speed may be improved without deteriorating an image quality.

When only one optical and photographing system is driven in a continuous shooting mode, it is not possible to set an exposure interval N, that is, an interval between a start of one exposure and a start of the next exposure, to be no greater than a photographing interval M, that is, a time needed for exposure and reading. This is because a subsequent exposure may not be started during exposure or reading in a single photographing device. In the present exemplary embodiment, the timing generator 117 is controlled such that an exposure start time (2) of one photographing device, for example, the photographing device "b", may be located between the exposure start time (1) and the exposure start time (3) of another photographing device, for example, a photographing device "a". As a result, the exposure interval N may be set to be no greater than the photographing interval M.

Thus, continuous shooting having a longer exposure time (a slower shutter speed) than that of the normal continuous shooting is possible. For example, a high speed continuous shooting may be possible in a dark photographing environment.

THIRD OPERATION EXAMPLE

Figure 5:
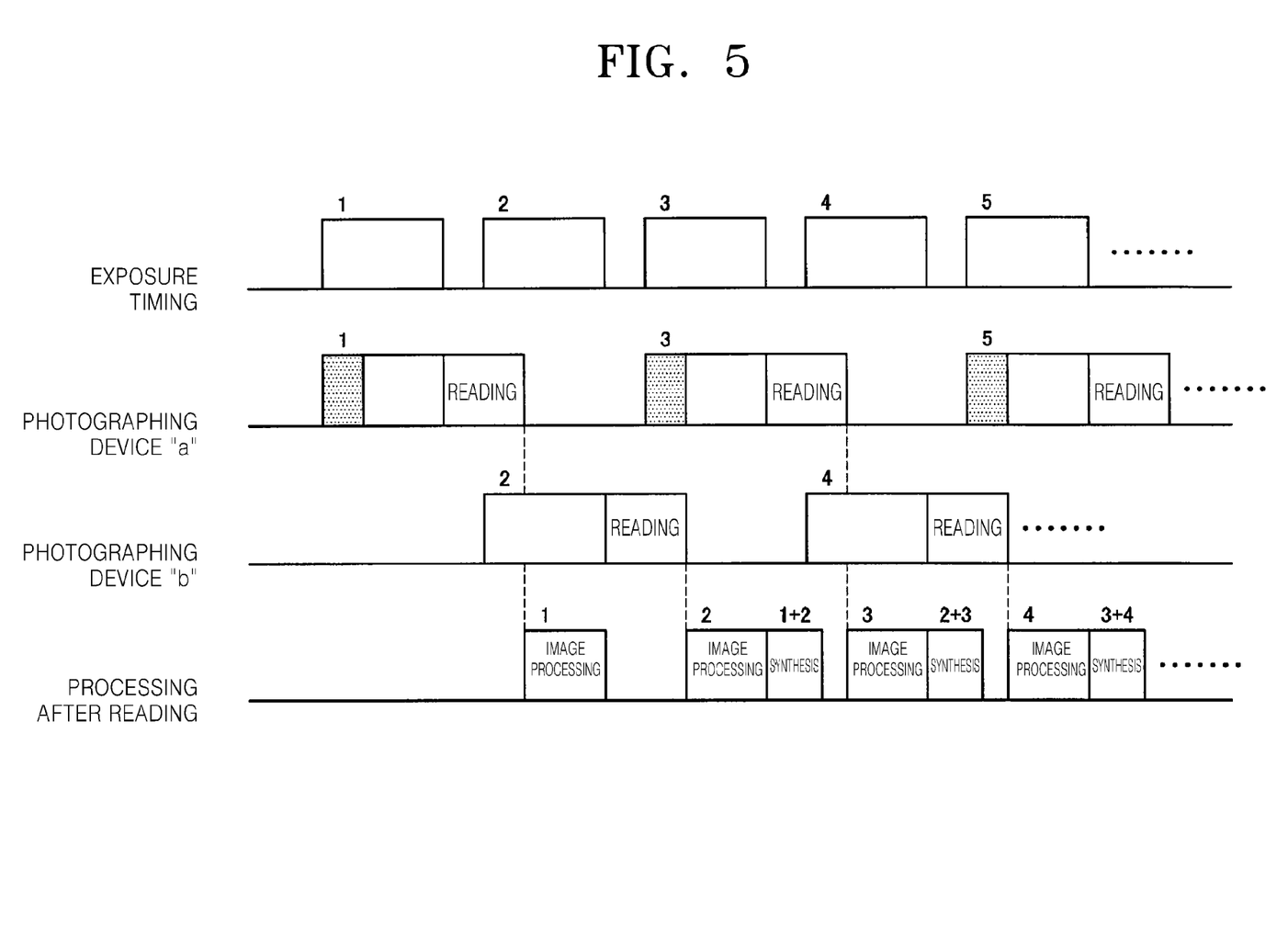
FIG. 5 is a timing diagram illustrating the third operation example of the photographing apparatus of FIG. 1.

FIG. 5 is a timing diagram illustrating the third operation example of the photographing apparatus 100 of FIG. 1. Referring to FIG. 5, the third operation example is a continuous shooting mode in which photographing is performed simultaneously with a flash and without a flash. The flash is an example of an illumination unit. In the third operation example, as in the first operation example, photographing is performed at a deviated phase such that an exposure start time of a photographing device, for example, a photographing device "a", may be located between two consecutive exposure start times of another photographing device, for example, a photographing device "b". In the process after reading, image data obtained by the photographing device "a" and image data obtained by the photographing device "b" are alternately processed so that continuous image data may be generated.

Also, the flash is timely illuminated for an object at the exposure timing of the photographing device "a". In a conventional flash photographing, it is difficult to increase a continuous shooting speed due to a limit in preliminary light illumination or charge time. According to the present exemplary embodiment, a high speed continuous shooting is possible by performing photographing with a flash using one photographing device, for example, the photographing device "a", and photographing without a flash using another photographing device, for example, the photographing device "b".

For example, the shutter speed, compression, and sensitivity of the photographing device "a" are set to be the same as photographing conditions for a normal photographing with a flash. By the photographing with a flash, a figure may be clearly photographed, for example, in a night scene. Since the photographing device "b" is set to a high sensitivity, photographing may be performed with an appropriate exposure in a relatively dark scene. For example, a background may be photographing in a night scene by the high sensitivity photographing. The image obtained by the photographing with a flash, that is, a first image obtained by the photographing device "a", and the image obtained by the photographing without a flash, that is, a second image obtained by the photographing device "b", are synthesized in a post processing. Thus, the quality of an image photographed in a place where the flash does not reach may be improved.

Also, when the color temperature of a flash and the color temperature of an indoor illumination are different from each other in an indoor photographing scene, an appropriate white balance may be set in each photographing device. Accordingly, the first image photographed with a flash and the second image photographed without a flash are synthesized so that an image in which the color of an object is appropriate may be obtained.

As an example, referring to FIG. 5, a first image is obtained by performing image processing to the image data obtained by the photographing device "a" with a flash and a second image is obtained by performing image processing to the image data obtained by the photographing device "b". The first image and the second image are synthesized to obtain a first synthesized image. Next, a third image is obtained by performing image processing to the image data obtained by the photographing device "a". The second image and the third image are synthesized to obtain a second synthesized image. Thus, the first image obtained by the first photographing device with a flash and each of the consecutive second images obtained by the second photographing device without a flash may be synthesized. Alternatively, the second image obtained by the second photographing device without a flash and each of the consecutive first images obtained by the first photographing device without a flash may be synthesized.

FOURTH OPERATION EXAMPLE

Figure 6:
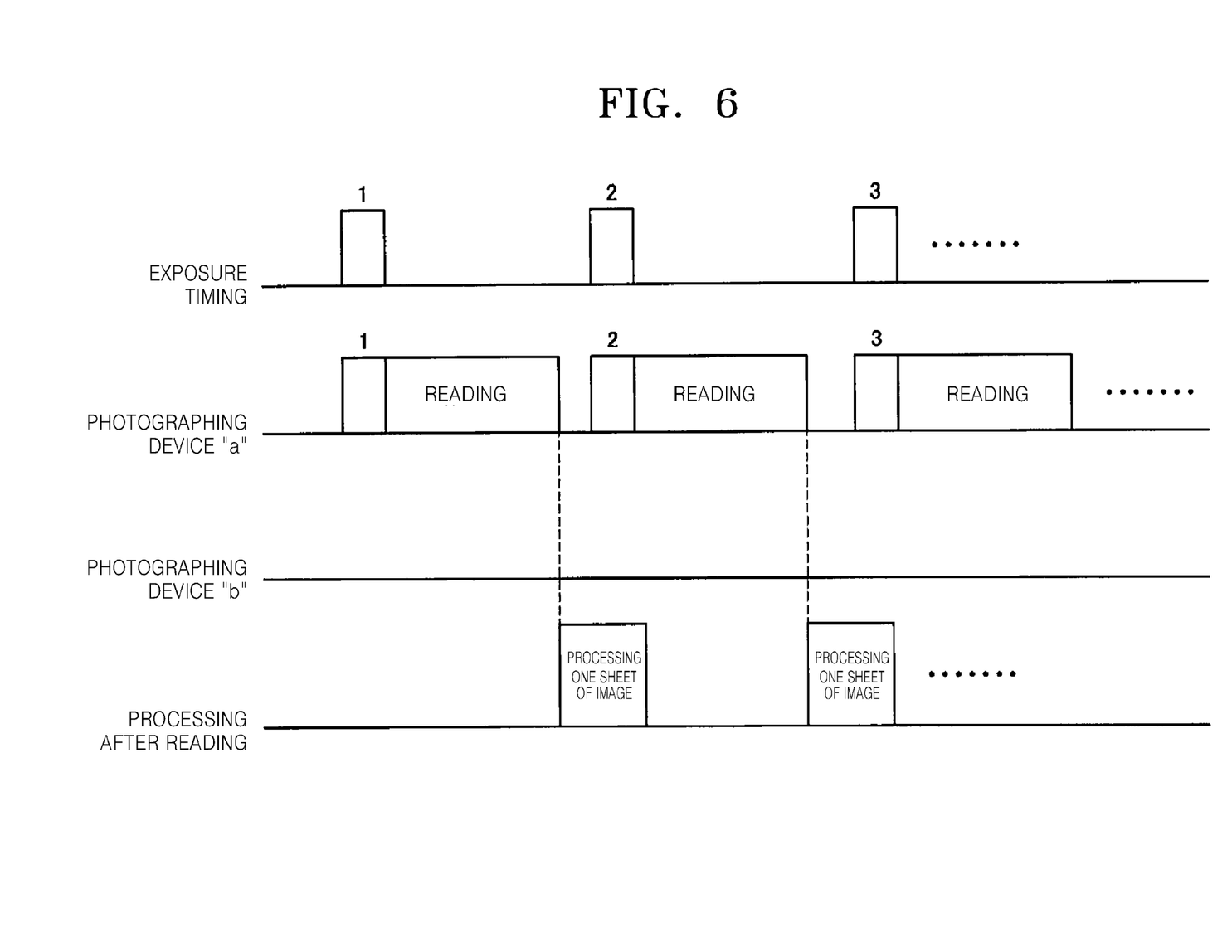
FIG. 6 is a timing diagram illustrating the fourth operation example of the photographing apparatus of FIG. 1.

FIG. 6 is a timing diagram illustrating the fourth operation example of the photographing apparatus 100 of FIG. 1. Referring to FIG. 6, the fourth operation example is a normal continuous shooting performed by one optical and photographing system. In the photographing apparatus 100, a photographing mode in which only the photographing device "a" is driven and the other photographing device "b" is not used is possible, as illustrated in FIG. 6. The photographing device "b" is in a sleep mode. Accordingly, the photographing device 100 may be used by switching the high speed continuous shooting mode of the first through third operation examples and the normal continuous shooting mode of the fourth operation example.

FIFTH OPERATION EXAMPLE

Figure 7:
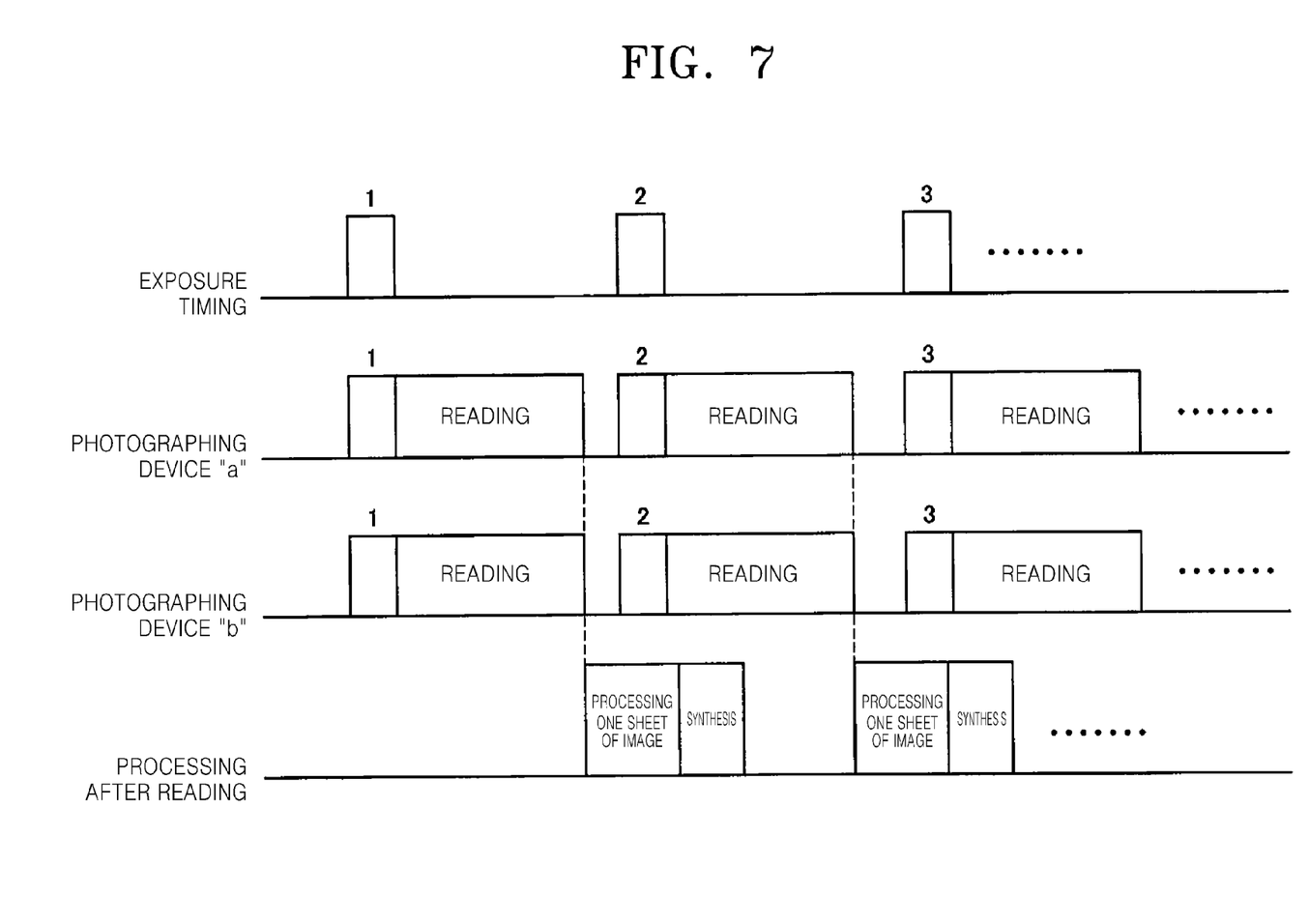
FIG. 7 is a timing diagram illustrating the fifth operation example of the photographing apparatus of FIG. 1.

FIG. 7 is a timing diagram illustrating the fifth operation example of the photographing apparatus 100 of FIG. 1. Referring to FIG. 7, the fifth operation example is a high sensitivity mode that may be implemented for a normal continuous shooting mode or a single shooting for photographing an image frame by frame. In the normal continuous shooting mode, a plurality of images are photographed at the same timing (the same phase). A plurality of images are generated by post processing and high precision position alignment is performed to the generated images so that an image synthesis process may be performed. Then, by outputting a frame of a synthesized image, a high sensitivity image having a low SN deterioration may be obtained. Thus, by performing addition processing to the images photographed at the same phase, high sensitivity photographing may be implemented without deterioration in the image quality.

In the fifth operation example, unlike the first operation example, photographing is performed at a phase in which an exposure start time of a photographing device, for example, the photographing device "a", is the same timing as the exposure start time of another photographing device, for example, the photographing device "b". In the process after reading, any of image data obtained by the photographing device "a" and image data obtained by the photographing device "b", which may be a reference image data, is primarily image processed and then both image data are synthesized. When the above process is repeated, a normal continuous shooting mode is implemented. When a single frame of still images is obtained, a single shooting mode is implemented.

As described above, according to the one or more of the above embodiments of the present invention, continuous still images in which reduction of sensitivity and deterioration of image quality are prevented may be obtained. Also, since an exposure time may be set to be longer than a continuous shooting interval which has been impossible in the related art, even when, for example, a shutter speed on a low illumination condition is longer than one second, the continuous shooting does not extend and high speed continuous shooting is possible.

The device described herein may comprise a processor, a memory for storing program data and executing it, a permanent storage such as a disk drive, a communications port for handling communications with external devices, and user interface devices, etc. Any processes may be implemented as software modules or algorithms, and may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the present invention.

What is claimed is:

1. A photographing apparatus comprising:
   a first photographing device converting incident light from an object through a first optical system to an electric signal;
   a second photographing device converting incident light from the object through a second optical system to an electric signal;
   an image signal processing unit generating a first image signal corresponding to the electric signal converted by the first photographing device and a second image signal corresponding to the electric signal converted by the second photographing device;
   an exposure control unit controlling a first exposure start time of the first photographing device and a second exposure start time of the second photographing device so that the first exposure start time and the second exposure start time are different from each other;
   an illumination unit for providing a flash during exposure of one of the first and second photographing devices and not providing a flash during exposure of the other one of the first and second photographing devices;
   a synthesis unit for synthesizing parts or the whole of the first image signal and the second image signal, wherein one of the first and second image signals is an image signal obtained by providing a flash and the other one thereof is an image signal obtained without providing the flash; and
   a position deviation detection unit for detecting information about position deviation between the first and second image signals, wherein the synthesis unit synthesizes parts or the whole of the first and second image signals based on the detected position deviation information,
   wherein the image signal processing unit performs image processing on the first and second image signals using the detected position deviation information, and generates a three dimensional image using at least one plane image having no position deviation information that is continuous according to a time between a first image corresponding to the first image signal and a second image corresponding to the second image signal or a plurality of pieces of position deviation information that are continuous according to a time between the first image and the second image.

2. The photographing apparatus of claim 1, wherein the exposure control unit controls that any one of the first exposure start time and the second exposure start time is located between continuous exposure start times of the other one of the first exposure start time and the second exposure start time.

3. The photographing apparatus of claim 1, wherein the exposure control unit controls that any one of the first exposure start time and the second exposure start time is located in a middle of continuous exposure start times of the other one of the first exposure start time and the second exposure start time.

4. The photographing apparatus of claim 1, wherein the exposure control unit controls that any one of the first exposure start time and the second exposure start time is located at an exposure time different from an exposure start time of the other one of the first exposure start time and the second exposure start time.

5. A photographing method comprising:
   converting light received through a first optical system from an object to an electric signal using a first photographing device;
   converting light received from the object through a second optical system to an electric signal using a second photographing device;
   generating a first image signal based on the electric signal converted by the first photographing device and a second image signal based on the electric signal converted by the second photographing device; and
   controlling a first exposure start time of the first photographing device and a second exposure start time of the second photographing device to be different from each other;
   providing a flash with an illumination unit during exposure of one of the first and second photographing devices and not providing a flash during exposure of the other one of the first and second photographing devices;
   synthesizing, with a synthesis unit, parts or the whole of the first image signal and the second image signal, wherein one of the first and second image signals is an image signal obtained by providing a flash and the other one thereof is an image signal obtained without providing the flash;
   detecting, with a position deviation detection unit, information about position deviation between the first and second image signals, wherein the synthesis unit synthesizes parts or the whole of the first and second image signals based on the detected position deviation information;
   performing, with an image processing unit, image processing to the first and second image signals using the detected position deviation information; and
   generating a three dimensional image using at least one plane image having no position deviation information that is continuous according to a time between a first image corresponding to the first image signal and a second image corresponding to the second image signal or a plurality of pieces of position deviation information that are continuous according to a time between the first image and the second image.

6. The photographing method of claim 5, wherein the controlling of a first exposure start time of the first photographing device and a second exposure start time of the second photographing device to be different from each other comprises:
   controlling any one of the first and second exposure times to be located between continuous exposure start times of the other one of the first exposure start time and the second exposure start time, when the first and second photographing devices are continuously exposed and read.

7. A non-transitory computer program product, comprising a computer usable medium having a computer readable program code embodied therein, said computer readable program code adapted to be executed to implement the photographing method of claim 5.

* * * * *